Dec. 24, 1946.     J. W. WILKIE ET AL     2,413,274
DUPLICATING MACHINE AND ELECTRICAL CONTROL THEREFOR
Filed March 20, 1941    7 Sheets-Sheet 2

Inventors
James W. Wilkie
Edmond G. Franklin

Patented Dec. 24, 1946

2,413,274

UNITED STATES PATENT OFFICE 2,413,274

DUPLICATING MACHINE AND ELECTRICAL CONTROL THEREFOR

James W. Wilkie and Edmond G. Franklin, Minneapolis, Minn., assignors to Continental Machines, Inc., a corporation of Minnesota Application March 20, 1941, Serial No. 384,342

8 Claims. (Cl. 90—13.5)

This invention relates to automatic, pattern following control mechanisms and refers particularly to duplicating machines which duplicate a contour from a given pattern by means of a tracer which follows the surface of the pattern, and a cutter or tool which shapes the work piece in conformity with the pattern.

Considerable difficulty has been experienced in the past in machines of this type for the reason that the control mechanism was unable to translate the dictation of the tracer into proper relative adjustment between the cutter and work with sufficient rapidity to achieve the desired accuracy without hunting. As a result duplicating machines heretofore in use have been subject to the objection of producing a step-like cut which only approximated the pattern.

It is, therefore, an object of the present invention to provide an improved control especially adapted for use with duplicating machines which is electrically controlled and operated for the reproduction of a pattern form or template and whereby the contour of the pattern or template is reproduced with a continuous smooth stepless cut.

More specifically, it is an object of this invention to provide a control of the character described whereby a cutting tool and a work supporting table will be actuated for motion relative to each other and wherein the relative movements of the cutting tool and work supporting table will be so coordinated that their respective speeds and direction are coordinates of the angle of reference of the contour scanned by the tracer finger.

Another object of this invention is to provide a duplicating mechanism of the character described which is sufficiently sensitive to enable the use of a pattern of relatively soft material such as plaster of Paris while the work being controlled is done on much harder material such as steel.

A further object of this invention is to provide a control of the character described which will reproduce a pattern or template within plus or minus .001 of an inch.

As already stated, it is an object of this invention to provide a control which is entirely electrical, and in this respect it is a further object of the invention to provide a control so designed that relays and other similar apparatus having substantial response lags are obviated.

Another object of this invention in this respect is to provide an electrical control wherein thermionic gaseous conduction tubes known as Thyratrons are utilized as the medium for controlling the voltage applied to the electric motors which drive the various parts of the machine to effect the duplicating function.

While an electrical control of this character is substantially instantaneous in its response, the electric drive motors have an inherent response lag which if not compensated, would vitiate to an extent the accuracy of the control.

It is, therefore, an object of this invention to provide means for accelerating the correction when required to accurately follow the dictation of the tracer.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention, constructed in accordance with the best mode so far devised for the practical application of the principles thereof, and in which.

Figure 6:
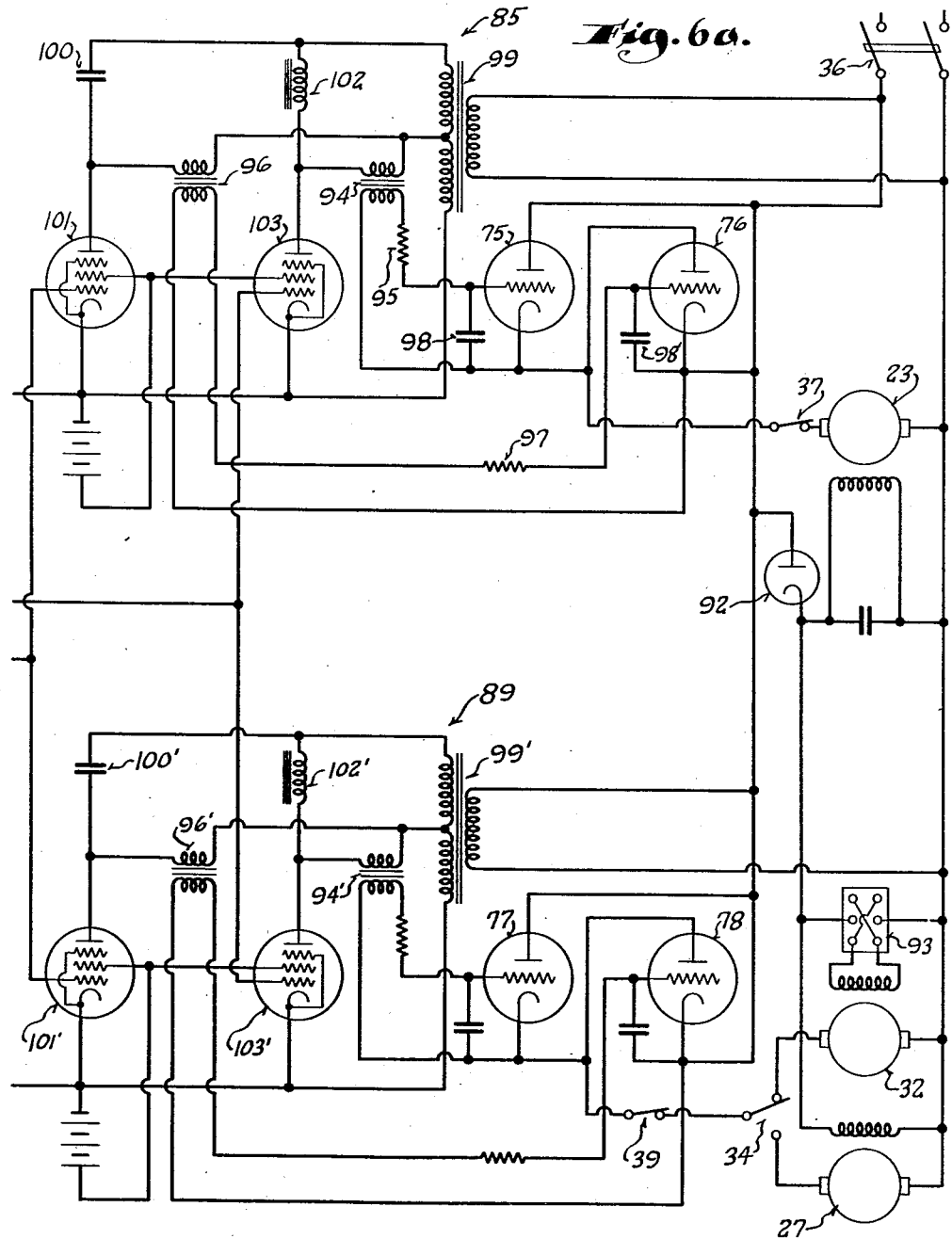
Figure 7:
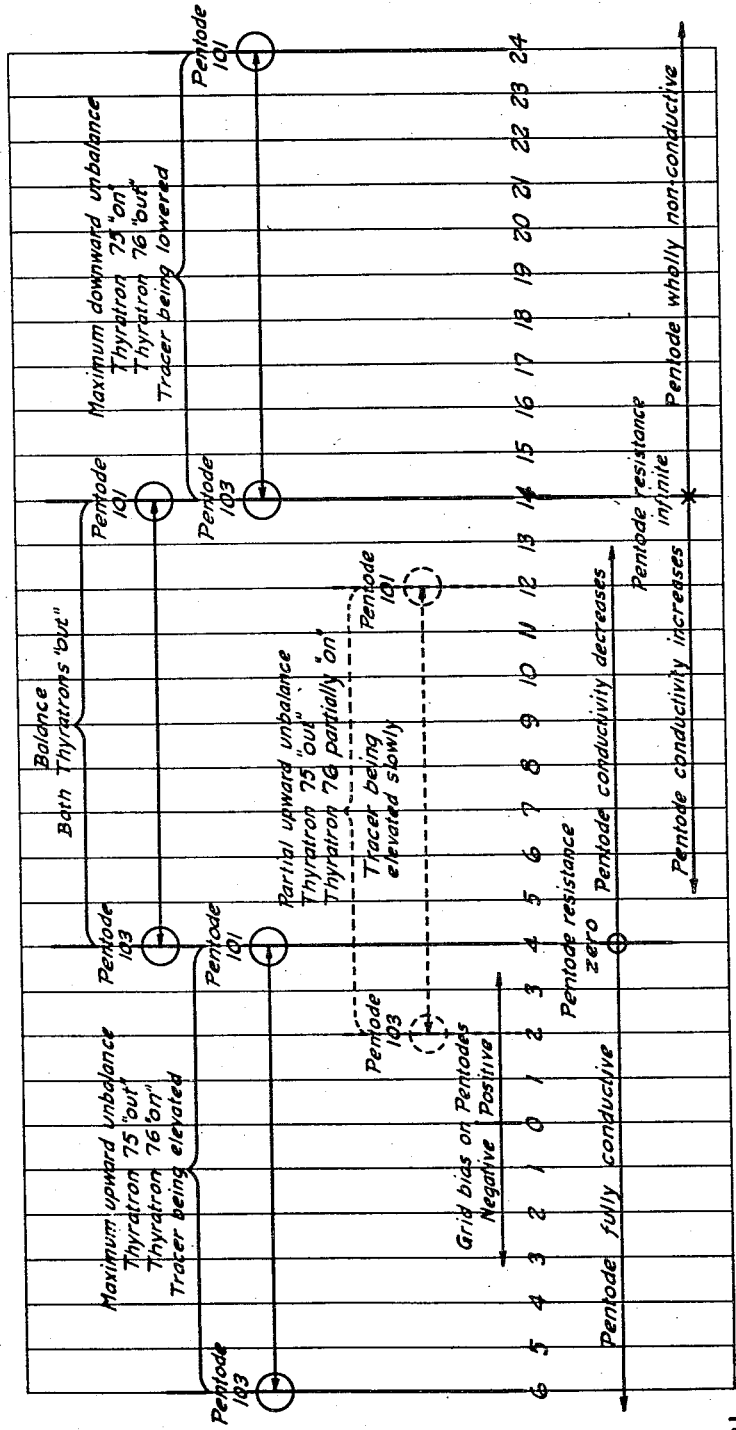

Figures 6 and 6a together constitute a complete wiring diagram of the entire electrical system; and Figure 7 is a diagram illustrating the manner in which part of the system functions.

Referring now particularly to the accompanying drawings, in which like numerals indicate like parts, it will be seen that the invention has been illustrated in association with a duplicating machine which is essentially a vertical milling machine. For the sake of simplicity and clarity, many of the mechanical details of this machine have been omitted from the disclosure; and it is to be understood that the machine illustrated is but a representative showing, for the invention is not limited to use with duplicating machines of this type, or in fact, with any duplicating machine. It is readily susceptible for use wherever a tracer scanning a pattern is to smoothly and uninterruptedly control mechanism in strict accordance with contour changes in the pattern.

The machine illustrated has a suitable base or pedestal 6 on which a work supporting table 7 is mounted for horizontal reciprocation. At the rear portion of the base is an upright standard or pillar provided with horizontal guideways 8 in which a slide head or carriage 9 is slidably supported to move cross-wise of the table 7.

The slide head or carriage 9 extends forwardly to overhang the reciprocating work table and carries a cutter head 10 and a tracer head 11.

The cutter head 10 comprises a tubular quill 12 slidable in a vertical bore 13 in the front end of the slide head or carriage 9. Within the quill is the spindle 14 of the cutter head to which the cutter or tool 15 is secured in the customary manner. The upper end of the spindle has a drive pulley 16 slidably splined thereto and about which belts 17 are trained to provide a drive for the spindle regardless of the position of vertical adjustment of the cutter head.

The belts 17 are driven through a suitable variable speed transmission indicated generally by the numeral 18, from a spindle drive motor 19 housed within the slide head or carriage 9.

A bracket 20 fixed to the upper and lower ends of the quill extends laterally from the cutter head to mount the tracer head 11 and thereby rigidly connect these units for simultaneous vertical adjustment. Such adjustment is effected by means of a feed screw 21 disposed vertically in back of the cutter head assembly and within the slide head or carriage 9.

A nut 22 fixed in a rearwardly extending arm on the bracket 20 is threaded on the feed screw 21 so that rotation of the screw either raises or lowers the connected cutter and tracer heads.

Rotation is imparted to the feed screw 21 from a vertical feed motor 23 connected to the screw 21 through transmission gearing indicated generally by the numeral 24. The motor 23 is of the reversible direct current type and operates at the dictation of the tracer in a manner to be hereinafter described.

The entire slide head or carriage 9 as hereinbefore noted is movable horizontally forwardly and backwardly. Such motion is imparted to the head or carriage by means of a feed screw 25 threaded in a nut 26 fixed to the undersurface of the head or carriage and extending down into the base.

The screw 25 is driven by a direct current reversible motor 27 connected thereto through suitable transmission gearing indicated generally by the numeral 28.

The work supporting table 7 may be of any conventional design and construction and is adapted to have a piece of work W secured thereto in position to be acted upon by the cutter or tool 15.

The pattern P which is to be duplicated is likewise secured to the work table in position to coact with the stylus 29 of the tracer head. Any suitable means may be employed for securing the work and the pattern to the table, but care must be exercised that their center distance, that is, the distance between the centers of the work and the pattern, is the same as the distance between the centers of the tracer stylus and the cutter or tool.

Also, the work engaging point of the stylus must be the same size and shape as the milling cutter or tool.

Reciprocation of the work table is effected by a long horizontal feed screw 30 disposed longitudinally beneath the work table and journalled in suitable bearings carried by the base.

A nut 31 fixed to the work table is threaded on the screw 30 so that rotation of the screw propels the table to right or left depending upon its direction of rotation. Rotation is imparted to the screw 30 from a direct current reversible horizontal feed motor 32 conveniently located within the base and drivingly connected with the screw through transmission gearing indicated generally by the numeral 33.

Inasmuch as it is common practice to provide machines of this type with limit switches and reversing switches controlled from the motion of the work table for changing the direction of table motion at the proper time and also for indexing or shifting the table laterally of its direction of reciprocation to cause the tool to traverse the work and for the sake of clarity these features have been omitted.

For purposes of illustration, however, the disclosure of the system to be later considered includes a switch 34 for selectively connecting either the horizontal feed motor 32 or the cross feed or indexing motor 27 with the control.

The switch 34 is part of a control panel 35 by which the operator controls the entire machine. In addition to the switch 34 the panel mounts a main power switch 36 by which the power to the control is turned on and off; a vertical control switch 37 by which the operator may turn on the vertical feed motor to lower the tracer and cutter heads; a push button switch 38 enabling manually controlled elevation of the connected tracer and cutter heads; a horizontal feed motor control switch 39 by which the horizontal feed motor 32 is turned on; and three push button switches, 40, 41 and 42.

The center push button switch 41 is a release switch by which the automatic control is disconnected from the horizontal feed motor enabling said motor to be manually turned on for operation in one direction or the other by means of the push button switches 40 and 42.

Hence, it will be seen that by manual operation of the proper switches the connected cutter and tracer heads may be brought into proper cooperative relationship with the work and pattern.

The panel 35 also mounts an indicator meter 43 which serves to visually indicate the position of the stylus of the tracer head with relation to a neutral balanced position. A deflection of the meter needle to the left indicates that the stylus is out of balance in an upward direction while deflection of the needle to the right indicates an out of balance condition in a downward direction.

The control, that is, the physical components thereof and their wired connections, are preferably encased in a cabinet 44 which may be located wherever desired but is preferably mounted within the base of the machine.

Tracer head

The tracer head comprises a tubular body 45 adjustably secured in the supporting bracket 20 by a sleeve 46 threaded to the tubular body and journalled in the bracket. Hence, through rotation of the sleeve 46, adjustment of the vertical position of the tracer assembly with relation to the cutter head may be effected.

The lower end of the tubular body has a double counterbore providing a horizontal seat 46', against which a flexible diaphragm 48 is clamped by a retaining nut 49 threaded into the outer counterbore. The retaining nut 49 has a central bore through which a stem 50 passes. This stem is secured to the flexible diaphragm by a clamping nut 51 and its lower end carries a chuck by which the stylus 29 is removably secured to the stem.

Figure 1:
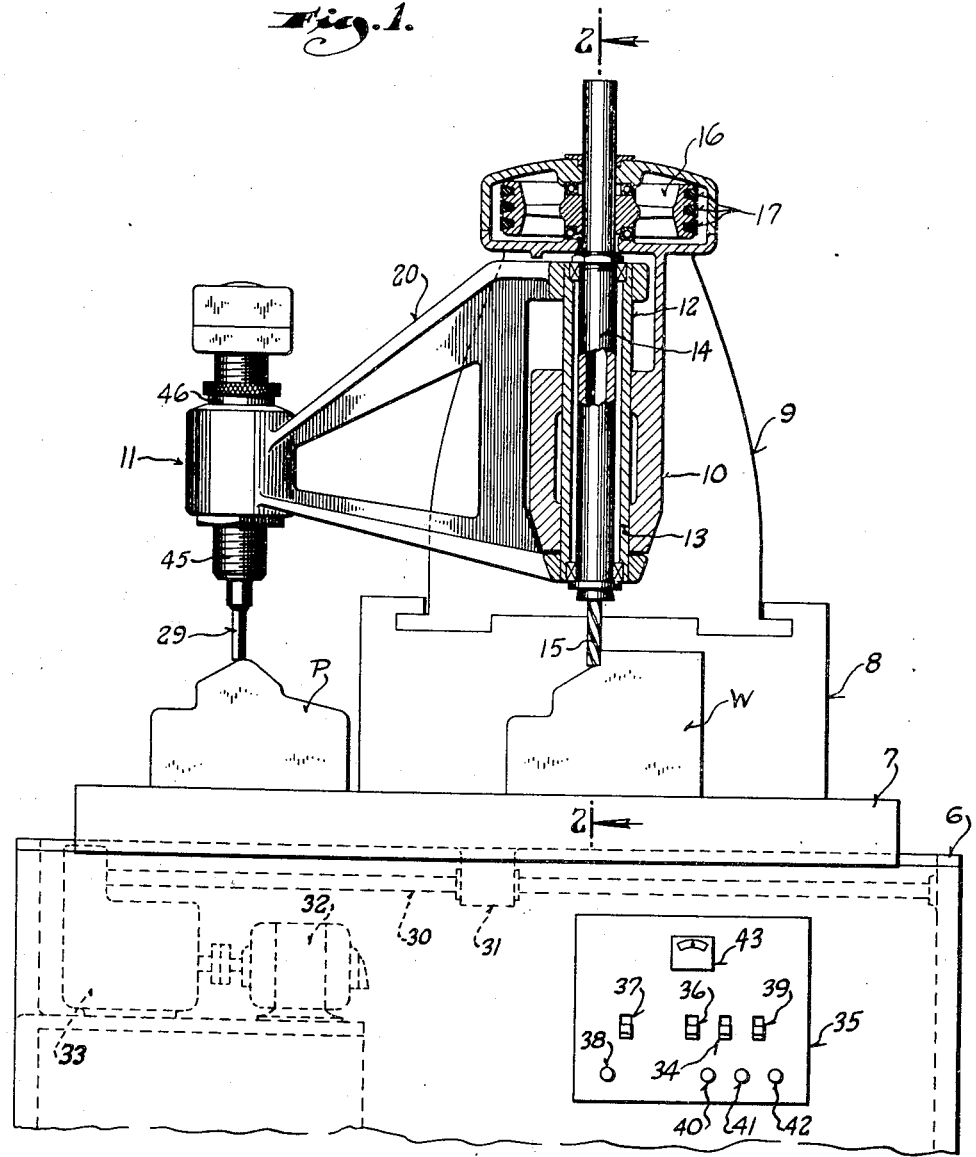
Figure 1 is a front view of a duplicating machine having portions thereof broken away and in section, and illustrating one application of this invention.
Figure 2:
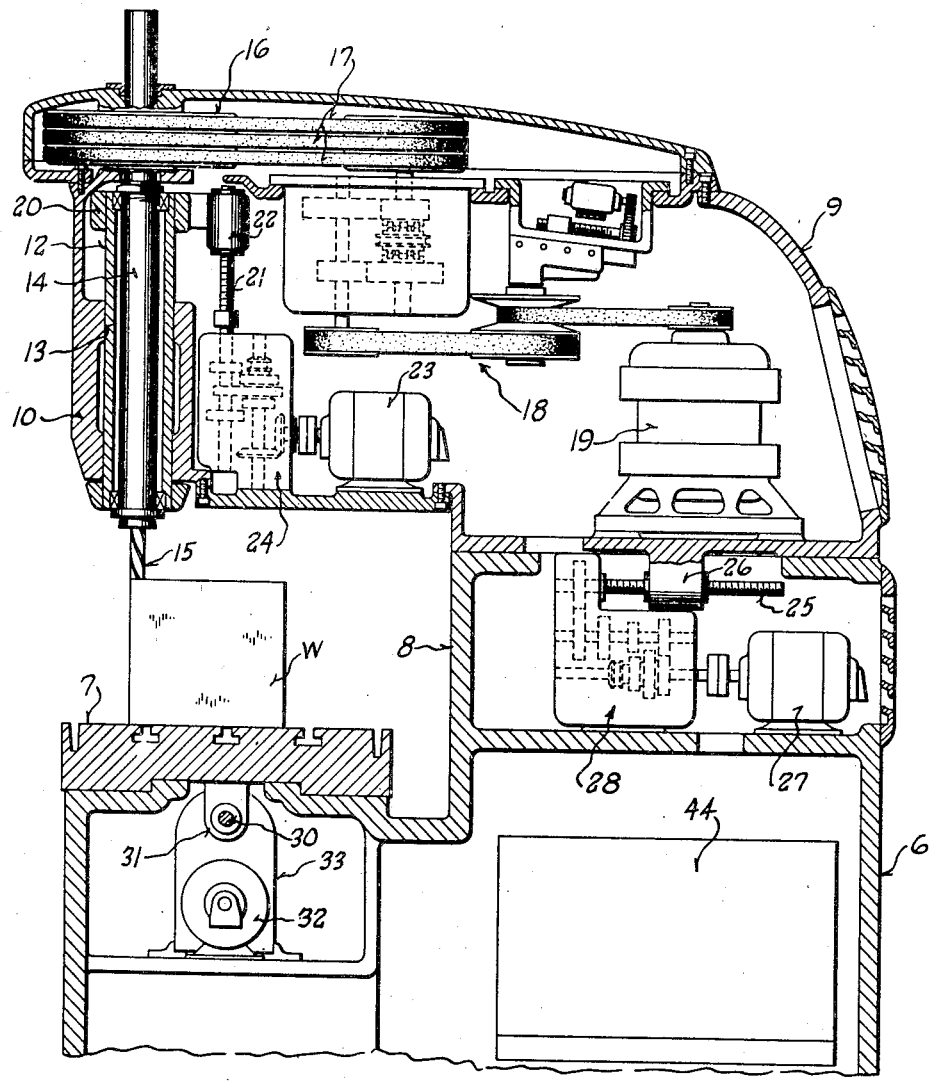
Figure 2 is a cross-sectional view through the duplicating machine taken on the plane of line 2—2 in Figure 1.
Figure 3:
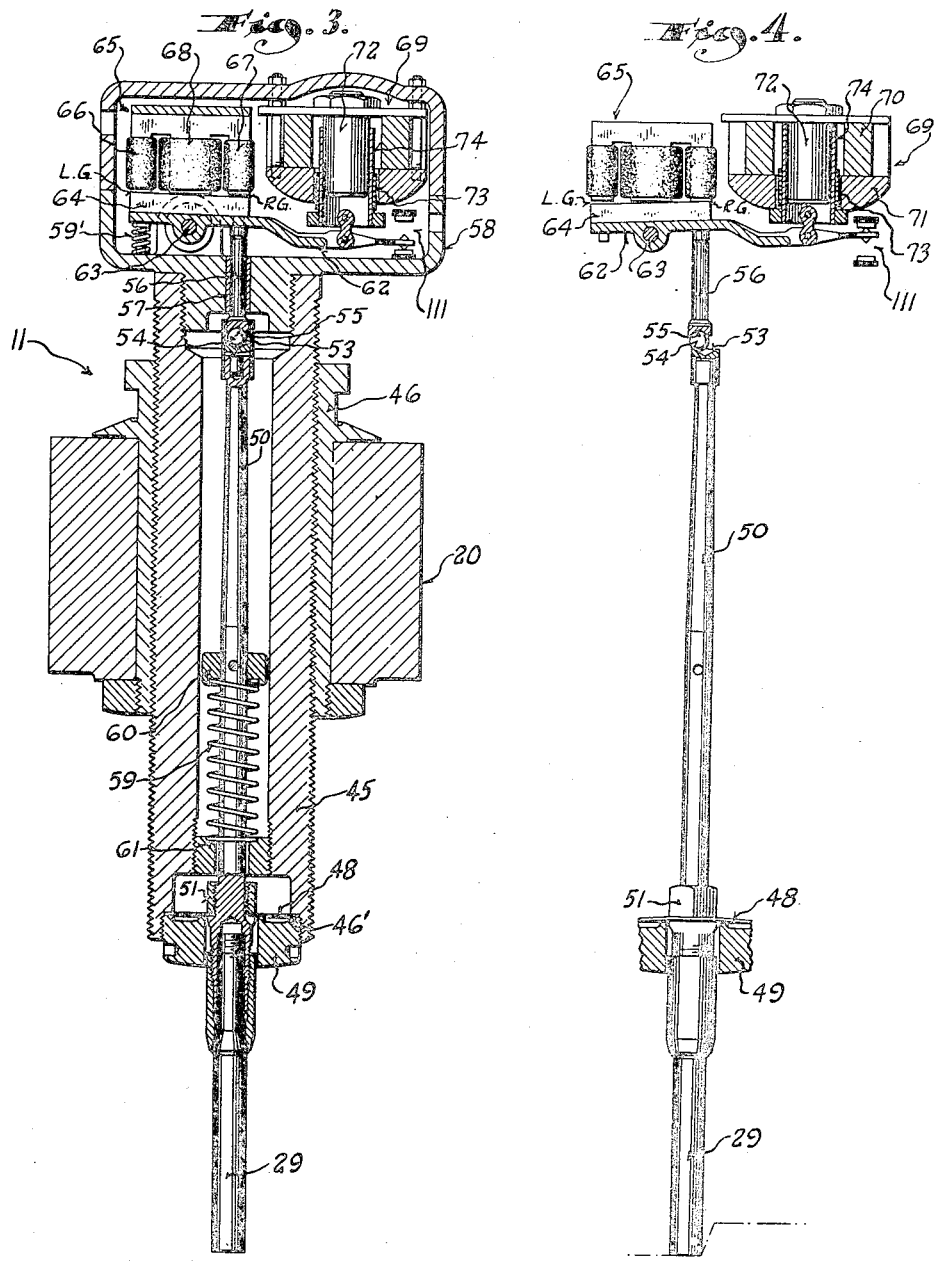
Figure 3 is an enlarged longitudinal sectional view through the tracer head.

The diaphragm 48 thus supports the stem and the stylus in a manner permitting limited upward axial movement thereof from a free position shown in Figure 3, as well as limited rocking motion about a pivot point lying substantially at the center of the diaphragm.

The stem 50 extends up through the hollow body 45 and at its extreme upper end has a substantially conical socket 53 formed axially therein. A ball 54 seated in this socket and a similar conical socket 55 in the bottom of a vertically reciprocal stem 56 connects the stems in a manner to translate rocking motion of the stem 50 into reciprocation of the stem 56, the stem 56 being constrained to axial motion by a bearing 57. This bearing is mounted in the base of a head 58 secured to the upper end of the body 45.

A compression spring 59 coiled about the lower portion of the stem 50 and confined between a collar 60 fixed to the stem and a spring seat 61 secured in the lower end of the body 45, yieldingly urges the connected stem and stylus upwardly with a force slightly less than that of a spring 59' which applies a downward force on the stylus assembly in a manner to be described. The difference between the upward forces of the two springs is the measure of the contact pressure with which the stylus engages the pattern.

In the free condition of the parts shown in Figure 3, the diaphragm 48 rests on the stop provided by the retaining nut 49 and the stylus is in axial alignment with the stem 56 so that the ball 54 is at the bottom of the conical socket 53. In this position of the parts, the stem 56 obviously is at its lowermost position. Any motion of the stylus either laterally or vertically, produces an upward displacement of the stem 56.

Figure 4:
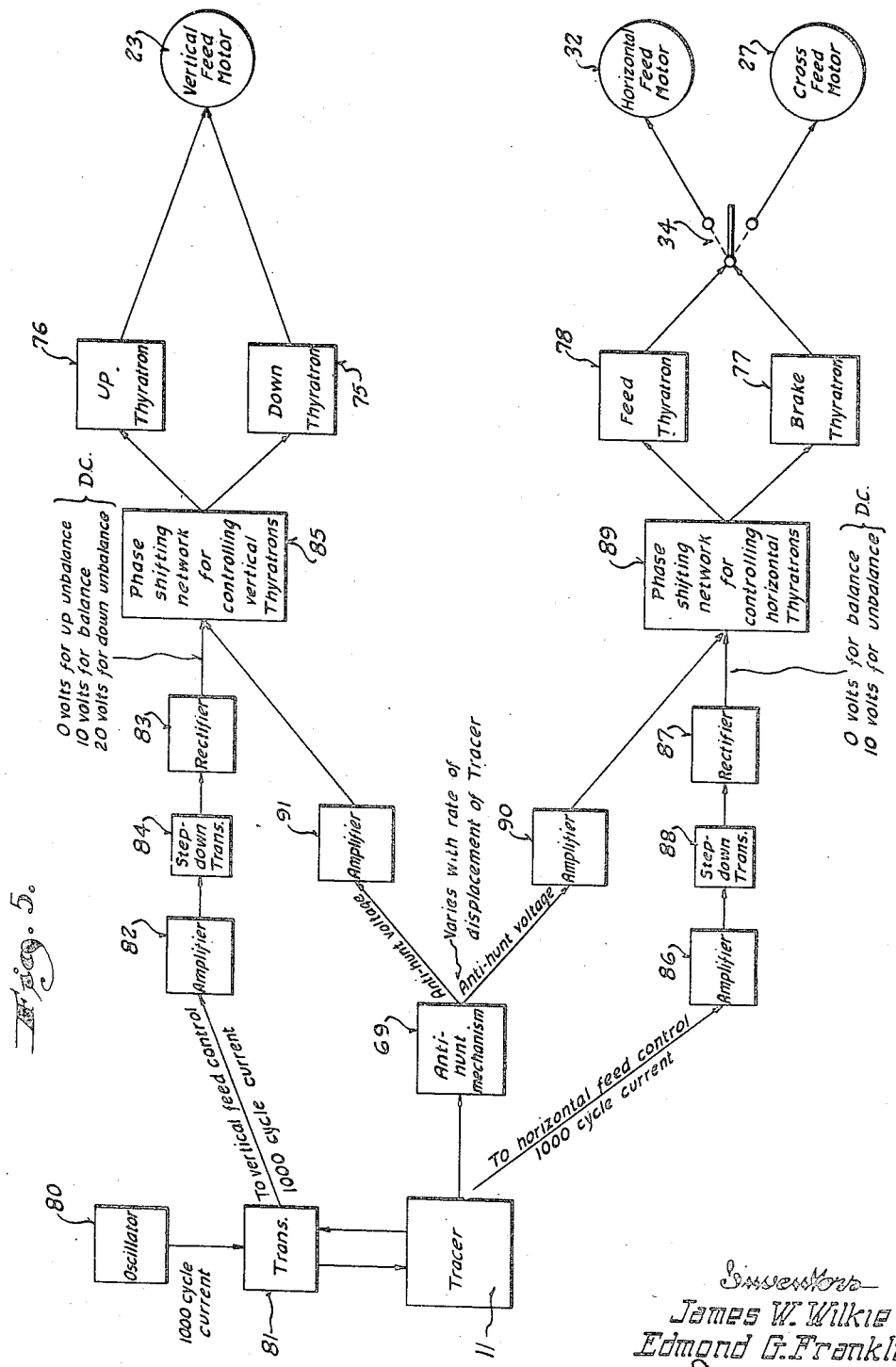
Figure 4 is a view diagrammatically illustrating the manner in which lateral or side-wise displacement of the tracer stylus is translated into motion on the part of the controlling element of the electrical system.

The manner in which axial upward pressure on the stylus transmits such motion to the stem 56, is of course, obvious. In the case of lateral or sidewise displacement, as illustrated in Figure 4 the slight tilting of the stylus and stem 50 causes the ball 54 to ride up the inclined wall of the socket 53 and impart the desired upward motion to the stem 56. When adjusted for use, the tracer stylus is in a neutral or balanced position with the diaphragm lifted slightly from the stop nut 49 so that downward as well as upward, or in other words, negative as well as positive displacement of the stylus is possible. Attention is also directed to the fact that lateral or sidewise displacement is possible at any axial position of the stylus. Hence, a pattern condition which effects both axial and lateral displacement produces a cumulative effect on the control element 56.

This up and down motion of the stem 56 is utilized to control the electrical system that governs the operation of the various drive motors. When the stylus approaches an eminence or upward slope on the pattern, the stem 56 is lifted. Because of the arrangement of the electrical circuit by which the tracer controls the motor that raises and lowers the cutter head, such lifting of the stem 56 causes the cutter-tracer couple to be elevated the same amount as the stylus displacement. This restores the position of the stylus in the tracer head to the normal or balanced position. Should the stylus approach a downward slope, the reverse process takes place, and the cutter-tracer couple descends the proper amount.

If an abrupt shoulder on the pattern is encountered, the sidewise or lateral displacement of the stylus produced thereby shuts off the horizontal feed motor and turns on the vertical feed motor until the connected cutter and tracer heads and, of course, the stylus also, have risen in a straight line to the top of the shoulder.

An abrupt step or depression results in maximum downward displacement of the stylus which simultaneously stops the horizontal table feed and actuates the connected cutter and tracer heads downwardly until the stylus again assumes a balanced position contacting the bottom of the depression or cavity in the pattern.

The vertical displacement of the stem 56 in response to the described displacement of the stylus, as clearly shown in Figures 3 and 4, is translated into an up and down oscillating motion on the part of a lever 62, pivoted as at 63, to the base of the head 58. The spring 59' acts against this lever to rock the same about its fulcrum in a clockwise direction to react against the upward force imposed on the stylus assembly by the spring 59.

Balanced above its pivot or fulcrum 63, the lever 62 carries a rectangular laminated armature 64 which forms part of a variable gap control transformer 65. The core of this transformer is made up of E-shaped laminations and is mounted with the open side of the E facing downward to be closed by the armature 64. When the armature 64 is in a neutral horizontal position the gap between it and both ends of the E-shaped core is one-thousandth of an inch (.001").

For the armature to occupy its neutral position requires the stylus to be lifted to a point exactly midway of its range of controlling displacement. Hence, either end pressure or side pressure on the stylus closes the right hand gap RG and increases the left hand gap LG, whereas descent of the stylus from its neutral position results in a reverse condition at the gaps so that when the tracer finger hangs free the left hand gap LG is closed while the right hand gap RG is open.

On each leg of the control transformer 65 is a coil. The coils mounted on the outside legs in the particular embodiment of the invention disclosed, have eighty-five (85) turns. The left hand coil is designated 66 and the right hand coil, 67. The center coil 68 which will be referred to hereinafter as the tracer pick-up coil has two thousand eight hundred ninety (2890) turns.

The two outside coils, 66 and 67 are connected in series in such a manner that they circulate flux through the armature in the same direction at any given instant, and they constitute the excitation windings of the control transformer being supplied with alternating current, one thousand (1,000) cycles, in a manner to be described.

If the armature is in its neutral position so that both air gaps, LG and RG are equal, no voltage will be induced in the tracer pick-up coils 68. If, however, the armature is unbalanced so that one gap is wider than the other, an E. M. F. is induced in this coil, the magnitude of which is proportional to the amount of unbalance of the armature, being maximum when one gap is zero.

The phase of the voltage induced in the tracer pick-up coil is determined by the direction of unbalance. During an upward condition of unbalance when the gap RG is closed, the voltage induced in the core will be 180° out of phase with the voltage induced therein during a downward condition of unbalance when the gap LG is closed. This change in phase may be used to determine the direction of unbalance of the tracer in a manner to be hereinafter described and in so doing, may be utilized to control the drive motors, as required to have the tracer accurately follow the pattern.

The up and down motion of the lever 62 is also utilized to generate an E. M. F. in an anti-hunt mechanism designated generally by the numeral 69 for the purpose of more accurately keeping the drive motors in step with the dictation of the tracer finger. This anti-hunt mechanism includes a circular magnet 70, with a ring-like pole piece 71 mounted in a fixed position, in any suitable manner, within the head 58 above the outer free end of the lever 62. A central cylindrical core or pole piece 72 extends down into the ring shaped pole piece 71 and is encircled by a coil 73 mounted on an insulated guide tube 74 which slides on the core 72.

The lower end of the tube 74 is connected to the free end of the lever 62 so that up and down motion of the lever slides the coil up and down in the bore of the pole piece 71, to generate an E. M. F. in the coil of a magnitude depending upon the rate of displacement of the coil. The coil 73 will be referred to hereinafter as the anti-hunt coil and it is to be borne in mind that the magnitude of the E. M. F. induced therein is dependent upon the rate of displacement of the coil.

Thus, whenever the pattern is an uninterrupted horizontal plane so that the stylus remains in its neutral position there is no E. M. F. induced either in the tracer pick-up coil 68 or in the anti-hunt coil 73. Any change in the pattern from this horizontal plane results in displacement of the stylus from its neutral position one way or the other to induce an E. M. F. in the tracer pick-up coil 68. If the rate of change called for by the pattern is slight so that rapid correction is not required, no appreciable voltage will be induced in the anti-hunt coil, but on the other hand, if an abrupt rise or descent is encountered so that rapid correction is required, the relatively faster displacement of the stylus, and consequently, the anti-hunt coil, induces a greater voltage in the anti-hunt coil which is used to accelerate the correction through the medium of proper electrical control mechanism to be hereinafter described.

*Control system generally*

The basic problem in a duplicator is to control and coordinate the speed of the vertical feed motor (which effects relative vertical adjustment between the table on which the work and pattern are mounted and the cutter and tracer heads) with the speed of either the horizontal feed motor or the cross feed motor (which reciprocate and index the table, respectively) to cause the tracer to follow the pattern. This is accomplished by a method which is, in effect, the equivalent of inserting resistance in the armature circuits of the motors, all of which, as already noted are shunt wound direct current motors with separate field excitation. Grid controlled rectifier tubes commonly called Thyratrons are used for this purpose.

These Thyratrons are used as half wave rectifiers to supply direct current from an alternating current source to the motor armatures. The average current through a Thyratron is controlled by controlling the time of starting of its anode current in each positive half cycle. This is done by applying alternating current to the grid and plate of the Thyratron simultaneously and by controlling the phase relation of this plate and grid voltage.

When the grid voltage is in phase (zero phase angle) with the plate voltage, the Thyratron will be conducting over the entire half cycle that its plate is positive. When the grid voltage is 180° out of phase with the plate voltage, the tube is non-conducting over the entire half cycle that its plate is positive. For an intermediate phase angle of 90° the tube will be conducting over approximately one-half the half cycle that its plate is positive.

It is, therefore, the phase angle between the plate and grid voltages which determines the portion of the positive half cycle that the tube is conducting, and consequently, the average current passed by the tube. Thus, by controlling the phase angle between zero and 180° the tube can be controlled from full on to full off and the motor speed will vary accordingly from full speed to zero.

Figure 5:
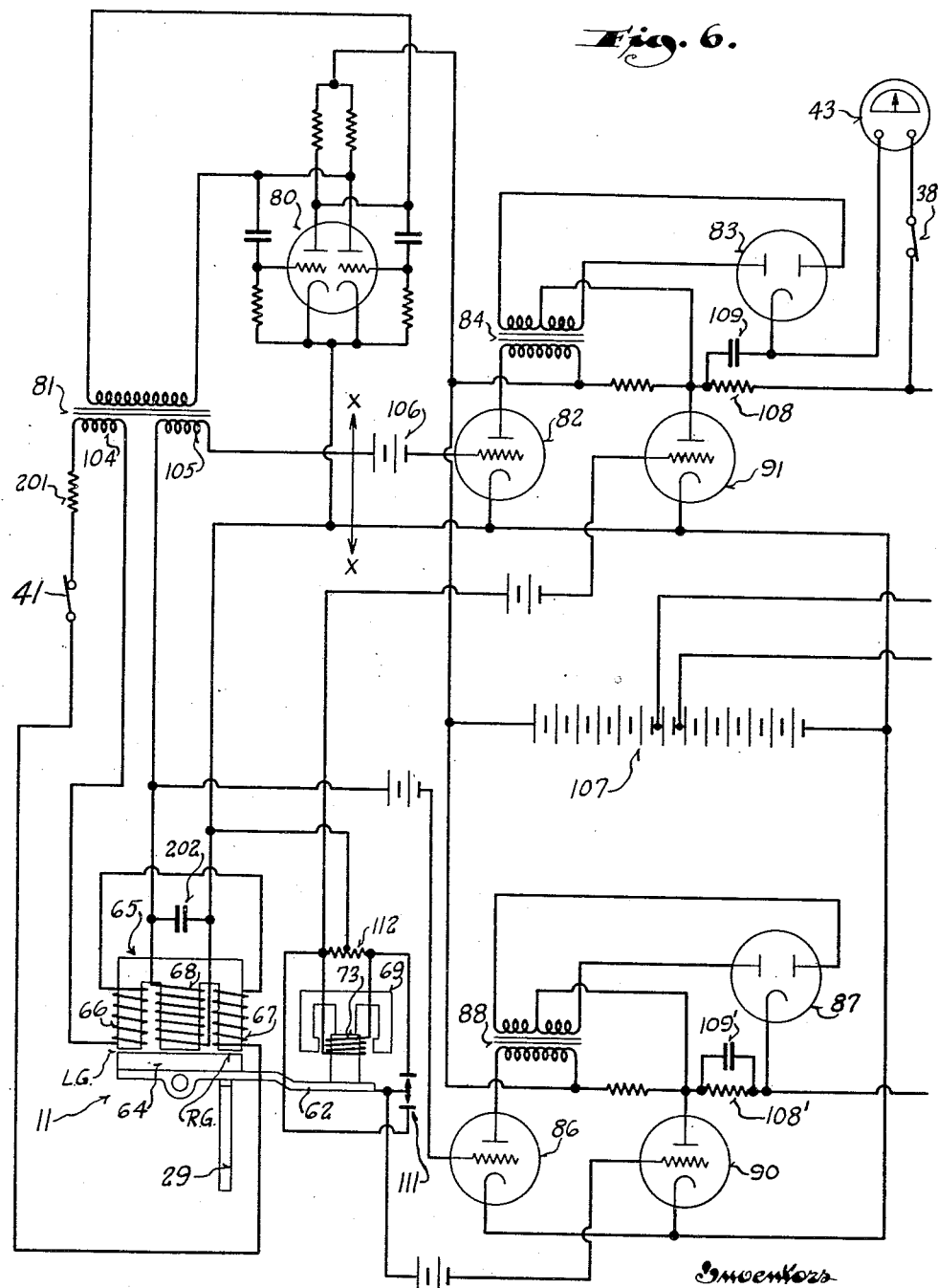
Figure 5 is a block diagram of the entire control system.

Referring now to the block diagram Figure 5, it will be seen that the vertical feed motor 23 is controlled by two Thyratrons; one the "down" Thyratron 75 which controls the speed of the vertical feed motor during downward adjustment of the tracer and the other the "up" Thyratron 76 which controls the speed of the vertical feed motor during upward adjustment of the tracer.

It will also be seen that the horizontal feed motor and the cross feed motor are controlled by two Thyratrons 77 and 78. Thyratron 78 controls the speed of the horizontal and cross feed motors during the actual feeding or travel of the table. The other provides in effect a brake to prevent over-travel of the motor driving the table. The output of these two Thyratrons, 77 and 78, is selectively connectible to either the horizontal feed motor or the cross feed motor by means of the switch 34.

The manner in which the various Thyratrons respond to the dictation of the tracer will now be briefly outlined with reference to the block diagram, Figure 5. As here shown, an oscillator 80, supplies alternating current to the primary of the transformer 81. The current supplied by the oscillator has a frequency of 1000 cycles. The transformer has two secondary windings, one supplying current to the excitation coils of the tracer and the other supplying an amplifier 82.

If the system is at balance, that is when the tracer or stylus is in its neutral or balanced position, the E. M. F. fed to the amplifier 82, is that derived from the transformer 81 unmodified in any respect by the tracer and which in this instance is one (1) volt one thousand (1000) cycles. But whenever the stylus is displaced from its neutral position the induced voltage in the tracer pick-up coil modifies the output of the transformer being fed to the amplifier, to either add to or subtract therefrom.

The amplifier 82 has a gain of approximately twenty-four (24) so that relatively low voltage may be used in the tracer head, thereby limiting the power required to operate the tracer unit to a minimum.

The output of the amplifier 82 which is still a one thousand (1000) cycle current, is fed into a rectifier 83 through a step-down transformer 84. This transformer has a ratio of 2.4 to 1. Hence, the voltage of rectifier output for a balanced condition of the tracer is ten volts D. C.

Inasmuch as a differential of ten volts above and below a neutral or normal of ten volts is required to activate one or the other of the two Thyratrons, 75 and 76 as will be hereinafter described, the design of the tracer pick-up coil is such that its modification of the voltage induced in the secondary of transformer 81 causes the voltage at the output of the rectifier 83 to go to zero for a condition of upward unbalance and to twenty (20) volts for a condition of downward unbalance.

Thus, an E. M. F. ranging from zero to twenty (20) volts D. C. may be fed from the rectifier 83 into a phase shifting network 85. This network utilizes the twenty (20) volt differential coming from the rectifier 83 to shift the phase angle between the voltages impressed on the plates and grids of the Thyratrons 75 and 76, and make one or the other Thyratron conductive to operate the vertical feed motor in the proper direction and at the proper speed to have it correct the vertical position of the connected tracer and cutter heads in accordance with the change dictated by the pattern.

The general description thus far applied to the block diagram refers only to the vertical feed motor control. A somewhat similar system obtains for the control of the horizontal and cross feed motors. However, in this instance, the E. M. F. induced in the tracer pick-up coil alone is utilized so that in this case the output of the tracer pick-up coil is fed directly to an amplifier 86 (similar to the amplifier 82) which is coupled to a rectifier 87 (similar to the rectifier 83) through a step-down transformer 88 (similar to the step-down transformer 84).

As the controlling voltage in this case comes solely from the tracer pick-up coil, it follows that for a condition of balance at which time no E. M. F. is induced in the pick-up coil, the voltage of the rectifier output is zero and for a maximum condition of unbalance, either upward or downward, the voltage of the rectifier output is ten volts D. C. This voltage is fed into a phase shifting network 89, which utilizes the ten volt differential to control the Thyratron 78.

As long as a condition of balance exists, the Thyratron is left fully conductive; but if the stylus is displaced from its neutral or balanced position, the voltage of the output of the rectifier 87 rises proportionately and through the control of the phase shifting network, the feed Thyratron 78 is controlled to pass a lower average current and reduce the speed of the horizontal feed motor accordingly.

For a condition of maximum unbalance when the voltage of the rectifier 87 is ten volts D. C., the phase shifting network 89 renders the feed Thyratron 78 non-conductive; and at this time the brake Thyratron 77 should be conductive to apply a reverse impulse on the horizontal feed motor if the anti-hunt mechanism 69 so dictates.

The anti-hunt mechanism, it will be recalled, is used to supply E. M. F. in consequence to the rate of displacement taking place at the tracer or stylus. Its function with relation to the horizontal feed motor or the cross feed motor thus is to apply a reversing impulse on the motor through the brake Thyratron whenever an abrupt change in the pattern contour, as for instance, a vertical wall encounters the stylus. To this end the output of the anti-hunt mechanism is first amplified by an amplifier 90, and then fed through the phase shifting network 89 to the brake Thyratron.

In a similar manner any abrupt change which may occur in the pattern causes the anti-hunt mechanism to accelerate the vertical correction. To this end the output of the anti-hunt mechanism is amplified by the amplifier 91 and fed in to the phase shifting network 85 to accelerate its controlling effect on the Thyratrons 75 and 76.

*The complete circuit*

Referring now particularly to the wiring diagram of Figures 6 and 6a, it will be noted that the field of each of the three motors is excited from a common source, namely, the output of rectifier tube 92, and that a reversing switch 93 which is controlled by the push buttons 40 and 42, is connected in the field circuit of the horizontal feed motor. This permits the direction of the horizontal feed motor to be manually controlled. In practice, it is, of course, customary to add limit switches (not shown) connected in parallel with the push buttons of the reversing switch to limit and reverse the travel of the work table.

The armature current for the motors is controlled by the Thyratrons as heretobefore noted, and considering first the control of the armature current for the vertical feed motor, it will be seen that the Thyratrons 75 and 76 which control this motor, are inversely connected in parallel with the cathode of one connected to the plate of the other and vice versa.

One side of the A. C. power line after passing through the main power switch 36, is connected to the cathode of the Thyratron 76 and to the plate of the Thyratron 75. The plate of the Thyratron 76 is connected to one side of the armature of the vertical feed motor 23 through the switch 37. The other side of the armature of the vertical feed motor is connected to the other side of the A. C. power line. The cathode of Thyratron 75 being connected with the plate of the Thyratron 76 is connected to the same side of the armature of the vertical feed motor as the plate of the Thyratron 76.

Thus inasmuch as current flows in a thermionic rectifier only in one direction, that is, from plate to cathode it is apparent that by making the proper tube conductive, it is possible to run the vertical feed motor either forward or in reverse since the polarity of the armature voltage determines the direction of rotation of the motor.

The situation with respect to the Thyratrons 77 and 78 which control either the horizontal feed motor of the cross feed motor depending upon the position of the switch 34 is the same as that described for the tubes 75 and 76 and the vertical feed motor. It is to be noted, however, that the selector switch 34 is connected in the lead running from the cathode of the feed Thyratron 78 and the plate of the brake Thyratron 77 and that the switch 39 is likewise connected in this lead.

With the Thyratrons connected to feed direct current to the motors as described, the remaining problem is to control the Thyratrons properly.

As already mentioned the average current through the Thyratrons is controlled by varying the time of starting of the anode current in each positive half cycle. This, as also previously stated, is effected by applying alternating current to the grid and to the plate of the Thyratrons simultaneously and then controlling the phase of the grid voltage. The plates of the Thyratrons are energized from the A. C. power source. The grid voltage is derived from separate coupling transformers energized from the A. C. line under the control of the phase shifting networks.

For the Thyratrons 75 and 76 of the vertical feed control, a coupling transformer 94 supplies the grid voltage through a suitable resistance 95 to the grid of the tube 75 while a similar coupling transformer 96 supplies voltage through a resistor 97 to the grid of the tube 76. The resistors 95 and 97 are used to limit the grid current drawn by the Thyratrons, and condensers 98 and 98' connected respectively across the grids and cathodes of the tubes 75 and 76 protect the tubes against surge voltages.

The phase shifting network 85 comprises a center tapped 220 volt transformer 99 across which are connected two series combinations, one comprising a condenser 100 and a pentode thermionic tube 101, and the other consisting of an inductance 102 and a pentode thermionic tube 103.

One side of the primary of the coupling transformer 94 is connected to the midpoint of the series combination comprising the inductance 102 and the pentode 103. The other side of said primary winding of the coupling transformer 94 is connected to the center tap of the power transformer 99. Similarly, one side of the primary of the coupling transformer 96 is connected to the midpoint of the series combination consisting of the condenser 100 and the pentode tube 101, while the other side of said primary winding is connected to the center tap of the power transformer 99.

The characteristics of the pentodes 101 and 103 are such that their plate-resistance is zero for grid voltages of —4 volts of more positive and infinite (practically speaking) for grid voltages of —14 volts or more negative. Intermediate values of grid voltages produce varying values of plate resistance between zero and infinity. A ten volt differential is thus needed to control the resistance of the pentodes between zero and maximum.

Through the two series combinations comprising the phase shifting network variations of the plate resistance of the two pentodes are utilized to make one or the other Thyratron 75 or 76 conductive.

The plate voltages of the Thyratrons are 180° out of phase. For a given instant when the left side of the A. C. line is positive, the plate of the Thyratron 75 is also positive being directly connected to said left side of the line, while the plate of the Thyratron 76 is negative. Hence, if the voltage impressed on the grid of Thyratron 75 is in phase with the line voltage it will be in phase with the plate voltage of Thyratron 75 and the tube will be conductive. It also follows that if the voltage impressed on the grid of Thyratron 76 is in phase with the line, it will be out of phase with the plate voltage on Thyratron 76 and this tube will be out.

Conversely, if the voltage on the grids of the two Thyratrons is out of phase with the line, the grid voltage of Thyratron 75 is out of phase with its plate voltage but the voltage on the grid of tube 76 will be in phase with the plate voltage thereof.

In view of the arrangement of the elements of the phase shifting network zero plate resistance at both pentodes, for the aforesaid given instant, gives the E. M. F. from the coupling transformers 94 and 96 an out of phase relation with the line and consequently with the Thyratron 75; while infinite plate resistance at both pentodes gives the E. M. F. from the coupling transformers 94 and 96 an in phase relation with the line but out of phase with the plate of Thyratron 76. Therefore, for zero plate resistance on the pentodes, Thyratron 75 is non-conductive and for infinite plate resistance on the pentodes, Thyratron 76 is non-conductive.

Inasmuch as Thyratron 75 controls the downward correction, that is, causes the connected tracer and cutter heads to lower, while Thyratron 76 controls upward correction, i. e. causes the connected tracer and cutter heads to rise, an upward unbalance must decrease the plate resistance of the pentodes while a downward unbalance must increase the plate resistance of the pentodes.

Bearing in mind that a —4 volts or more positive grid bias is necessary for the pentode's resistance to be zero and —14 volts or more negative grid bias is necessary for the plate resistance of the pentode to be infinite, it appears that by connecting a positive six volts bias on the grid of the pentode 103 and a negative four volts on the grid of the pentode 101 and then adding thereto a negative voltage, the value of which can be varied from zero to —20, in series with both of said grid biases, the conditions illustrated in the diagram Figure 7 can be attained.

As here shown the addition of half of the twenty volt differential to the applied grid biases, gives pentode 101 a grid bias of —14 volts and pentode 103 a grid bias of —4 volts. With these bias values on the pentodes their respective Thyratrons are "out" and the system is in balance.

For an upward condition of unbalance when the Thyratron 76 must become operative and the Thyratron 75 remain "out" or inoperative the grid bias on the pentode 101 must be made more positive than —14 volts. Any shift in the grid biases, however, affects both pentodes simultaneously and in the same direction. In other words, if the voltage on the grid of pentode 101 is shifted from —14 to —12 an equivalent two volt shift takes place at pentode 103, but this latter shift does not affect the situation as the plate resistance of pentode 103 is already zero (its grid bias being —4 volts) and any shift of the grid bias in the positive direction makes no change in the plate resistance of the tube.

For a downward condition of unbalance, the grid biases of the pentodes must be shifted in the negative direction as will be clear from the diagram, Figure 7.

Thus, if the tracer can be utilized to apply the additional grid bias differential in the manner described and particularly shown in Figure 7, the desired control of the Thyratrons will be accomplished.

The manner in which this twenty volt differential is applied to the grids of the pentodes as a result of the tracer displacement will now be described.

As noted hereinbefore, the tracer pick-up coil 68 has a voltage induced in it whenever the armature 64 is moved out of balance one way or the other in response to displacement of the tracer stylus produced by changes in the pattern. The excitation coils 66 and 67 of the variable air gap control transformer 65 are energized from a secondary winding 104 of the transformer 81. These coils 66 and 67 are connected in series in such a manner that they circulate flux through the armature 64 in the same direction at any given instant.

As pointed out hereinbefore, the tilting of the armature due to displacement of the tracer effects induction of E. M. F. in the tracer pick-up coil 68, the phase of the E. M. F. being determined by the direction of unbalance of the armature. For one position of unbalance of the armature the phase of the voltage induced in the pick-up coil 68 will be 180° out of phase with the voltage induced in the pick-up coil when the opposite condition of armature unbalance exists.

This change in phase is utilized to determine the direction of unbalance of the tracer as follows. A second secondary winding 105 on the transformer 81 is connected in series with the tracer pick-up coil 68 in such phase relation that their voltages are additive for the condition of the air gap RG being maximum (during downward tracer displacement) while for an opposite condition of armature unbalance (upward tracer displacement) the voltage of the winding 105 and the coil 68 cancel each other. To insure the proper phase relationship between the voltage of the pick-up coil and the winding 105, a resistance 201 is connected in the excitation circuit and a condenser 202 is connected across the pick-up coil.

To illustrate the effect of the pick-up coil, consider the voltage at X—X in Figure 6 without regard for the effect of the anti-hunt mechanism. For a condition of balance, that is when both air gaps LG and RG are equal, or one-thousandth of an inch (.001″), the voltage at X—X will be only the voltage of the secondary coil 105 of the transformer 81, since the voltage in the tracer pick-up coil will be zero.

For a condition of downward unbalance when the air gap RG is maximum or two-thousandths of an inch (.002″) and LG is closed, the voltage at point X—X will be the sum of the voltages of the secondary winding 105 and the tracer pick-up coil 68. In other words, to produce the twenty volt differential desired, the voltage at X—X at this time is one plus one—or two volts.

For an opposite or upward condition of unbalance the voltage induced in the tracer pick-up coil cancels that of the secondary winding 105 which results in zero voltage at point X—X. Consequently, the voltage at point X—X is an indication of the displacement of the armature of the control transformer.

Since a differential of zero to twenty volts D. C. is needed to control the phase shifting network 85 the one thousand (1000) cycle zero to two volt A. C. at point X—X must be amplified and rectified. To this end one lead from the secondary winding 105 is connected through a negative grid bias, 106, to the grid of the amplifier tube 82 and the output of the amplifier tube 82 is coupled through the step-down transformer 84 to the rectifier tube 83.

The plate voltage for the amplifier 82 is supplied from a B battery 107. Obviously, though, a power transformer with a voltage divider could be substituted for the battery, and in practice would be. The battery has been shown merely to simplify the disclosure.

Likewise for the sake of simplicity a battery is shown supplying voltage to the screens of the pentodes 101 and 103.

While the amplifier 82 has a gain of approximately twenty-four (24), the step-down transformer has a ratio of two and four tenths to one (2.4 to 1) so that the final voltage gain is ten (10) which raises the differential of two volts at point X—X to twenty volts D. C. at the output of the rectifier.

The rectifier output is manifested across a resistor 108 of 10,000 ohms, one side of which is connected to the center tap on the secondary of the transformer 84 while its other side connects through the switch 38 and the milliammeter 43 with the cathode of the rectifier 83. A condenser 109 connected across the resistance 108 smooths out the ripple. A full wave rectifying circuit is used since the percentage of ripple present in the filter output is directly proportional to the ripple frequency and would be twice as great for a half wave rectifier.

At this point it might be noted that the principal reason for using a thousand (1,000) cycle current instead of the commercial sixty (60) cycle current for energization of the tracer, is to increase the speed of response of the filter circuit output. Since it takes time to charge and discharge a condenser it is advantageous to have the condenser 109 as small as possible. With sixty (60) cycle current the condenser 109 would have to be five (5) mfd. to keep the A. C. ripple in the filter output below five (5) per cent. The time constant would then be five-tenths (.5) of a second. With one thousand (1,000) cycle current the capacity of the condenser 109 may be reduced to three tenths (.3) mfd. with the same five (5) per cent ripple present; but the time constant is reduced to three-thousandths (.003) of a second.

Inasmuch as the voltage drop across resistor 108 is a reflection of the tracer finger displacement, the measurement of the current flowing to this resistance affords an indication on the meter of the displacement of the tracer. For a balanced condition the meter needle is at the midpoint. For an upward unbalance it deflects to the left and for a downward unbalance it deflects to the right.

The stated differential of twenty volts manifested across the resistor 108 must be applied to the grids of the pentodes 101 and 103. This is accomplished as follows: the voltage of the B battery 107 or other B supply is two hundred volts. The cathodes of the phase shifting pentodes are tied together and connected through resistor 108 to the plate of the amplifier triode 91. The voltage drop across this triode 91 is 100 volts. The grid of pentode 103 is connected to a point on the battery one hundred-six volts above negative and the grid of pentode 101 is connected to a point on the battery ninety-six volts above negative.

Hence, it will be seen that if the voltage drop across resistance 108 is zero, the cathodes of the phase shifting pentodes are at a potential of one hundred volts positive with respect to the negative end of the B supply, and the grid of the pentode 103 is at one hundred-six volts positive above B minus. The resultant grid bias on the grid of pentode 103 is thus the difference between plus one hundred six (+106) and plus one hundred (+100), or plus six (+6) volts. At the same time the bias on the grid of the pentode 101 is the difference between one hundred (100) and ninety-six (96) or a negative four (−4) volts.

Obviously, then, if the voltage drop across resistance 108 is ten volts, the grid biases on both pentodes change by a negative ten (—10) volts, and therefore the grid bias on pentode 103 must now be a plus six (+6) minus ten volts or a negative four (—4), and the grid bias on pentode 101 must be a negative four (—4) volts minus ten volts, or a negative fourteen (—14) volts. Again, if the voltage drop across resistance 108 goes to twenty volts, the grid biases on the pentodes 101 and 103 will be similarly affected to give a grid bias of negative fourteen (—14) volts on pentode 103 and negative twenty-four (—24) volts on the grid of pentode 101.

Thus, it will be seen that the tracer supplies the phase shifting network with the direct current voltage previously described as being necessary to control the Thyratrons.

As long as the pattern does not call for abrupt changes in contour such as when an abrupt shoulder or rise in the pattern encounters the tracer, the response of the vertical feed motor is sufficiently rapid to properly correct the displacement of the tracer without hunting. When an abrupt change in contour of the pattern decrees immediate stoppage or full speed operation of the vertical feed, the response lag of the motor would introduce difficulties. To compensate for this inherent lag of the motor response and to accelerate its response to tracer dictation, the anti-hunt mechanism introduces into the control circuit a voltage that is proportional to a derivative of the displacement of the tracer.

This voltage is the E. M. F. induced in the anti-hunt coil 73. The magnitude of this voltage being proportional to the rate of motion of the coil, and the coil being actuated by the tracer, the voltage induced in the coil must be a derivative of the displacement of the tracer stylus. This voltage is necessarily of small magnitude, (less than one-tenth (.1) volt) and thus must be amplified.

Therefore, the output of the coil is coupled into the grid of triode 91 in such a manner that when the tracer stylus is pushed upward, the positive voltage then induced in the anti-hunt coil tends to decrease the voltage drop across triode 91, thus swinging the grids of pentodes 101 and 103 more positive. If the tracer stylus drops, the negative voltage induced in the anti-hunt coil and applied to grid of triode 91 increases the voltage drop across the triode 91 and thus makes the grid biases on pentodes 101 and 103 more negative.

The effect of the anti-hunt mechanism thus gives the circuit characteristics which might be described as predetermining or anticipating what is going to happen. It keeps the motor from hunting and enables it to stop quickly by using the reverse Thyratron as a brake.

While the voltage from coil 73 is referred to as an anti-hunt voltage, and its purpose is explained as correcting the lag of the motors, the term "anti-hunt" is used for the reason that if this measure is not taken to correct lag in the motors they would hunt or oscillate and the pattern would be traversed in a series of steps.

The circuit, so far described, covers only the operation of the control for the vertical feed motor. The horizontal feed motor must also be controlled. Assume that the table is given a horizontal feed of four (4) inches a minute and the vertical feed motor has a maximum rate of travel of four (4) inches a minute. It is evident then that the tracer cannot ascend or descend an angle greater than forty-five degrees (45°) (tan 45°=1).

Hence, the speed of the horizontal feed motor must be reduced on steep angles and even shut off on right angles. This is accomplished in a manner very much similar to that described in connection with the vertical feed motor and to the extent that the control for the latter motor duplicates that of the vertical feed motor, the control system for the horizontal feed motor will not be specifically described.

The primary difference between the control systems for the vertical feed motor and for the horizontal feed motor (and also the cross feed motor which may be operated alternately with the horizontal feed motor) is that in the former the motor is actually caused to run in one direction or the other at the dictation of the tracer stylus, while in the latter the tracer stylus merely turns the motor "on" and "off."

It is seen from the drawings that the phase shifting networks used to control the Thyratrons are identical for the vertical feed and the horizontal feed motors. For the horizontal feed control the phase shifting network comprises two series combinations consisting of a condenser 100' and an inductance 102' together with two pentodes 101' and 103'. Pentode 101' controls the phase of the grid voltage supplied to Thyratron 76 and pentode 103' controls the phase of the grid voltage supplied to Thyratron 77.

Thyratron 76 controls the running of the horizontal feed motor and the Thyratron 77 serves as a brake to stop the motor quickly in the event the tracer stylus runs into a steep wall.

In a manner similar to that of the vertical feed control system a bias of positive six (+6) volts is applied to the grid of pentode 103' and a bias of negative four (—4) volts is applied to the grid of pentode 101'. With these biases Thyratron 77 is "off" and Thyratron 76 is "on." If a negative ten (—10) volts is applied to the grids, both Thyratrons are off. Therefore, it is only necessary for the tracer to supply the network 89 with a direct current voltage of ten volts for an unbalanced condition and zero for a balanced condition.

Inasmuch as the E. M. F. generated in the tracer coil during both unbalanced conditions is one volt, amplification by the amplifier 86 and subsequent rectification after passing through stepdown transformer 88 provides the desired ten volt differential across a resistor 108'.

The manner in which this voltage drop across resistor 108' is applied to the network 89 is the same as that described in conjunction with the vertical feed control. When the tracer stylus is balanced the voltage drop across resistor 108' is zero and the horizontal feed motor travels at full speed, and when the tracer stylus is out of balance either up or down, the voltage drop across resistor 108' is ten volts and the horizontal feed motor is stopped.

In a manner similar to that discussed in connection with the vertical feed, a voltage taken from the anti-hunt coil and fed into amplifier 90 is used to correct the lag of the horizontal feed motor response. It will be noted that on the vertical feed whenever the tracer stylus is pushed upward a positive voltage must be supplied to the grid of triode 91 in order to correct the lag of the vertical feed motor, and whenever the tracer stylus drops, a negative voltage must be supplied to the grid of triode 91 for the same purpose.

However, on the horizontal feed this is not true. The horizontal feed motor must be running at top speed when the tracer is in balance and must be "off" when the tracer stylus is out of balance, either up or down. This means that if the tracer stylus moves from balance to unbalance (either up or down), a negative voltage must be supplied to the grid of triode 90 in order to correct the lag of the motor, and if the tracer stylus moves from out of balance (either up or down) back towards the balance point a positive voltage must be supplied to the grid of triode 90 to compensate for the lag of the horizontal feed motor.

Since it is obvious that the voltage generated in the anti-hunt coil is of the same polarity for approaching and leaving balance as the tracer stylus drops, and is of opposite polarity as the tracer stylus approaches and leaves balance during upward motion, a reversing switch 111 must be used to change the polarity of the anti-hunt voltage on the grid of triode 90 whenever the tracer stylus passes through balance. This reversing switch 111 is a single pole double throw switch, the midpoint of which is driven from the lever 62 and is electrically connected to the grid of triode 90. The two outer points are connected to the two leads from the anti-hunt coil.

A center tapped resistor 112 is placed across the anti-hunt coil and its center tap is connected to the cathode of triode 90. Thus it is seen that switch 111 reverses the polarity of the anti-hunt voltage applied to the grid of triode 90 each time the balanced point is crossed.

For positioning of the tracer horizontally, it is necessary that the tracer stylus be balanced before the horizontal feed motor will run. The equivalent of this can be effected electrically by opening switch 81 which it will be noted, is connected in series with the excitation windings of the tracer control transformer. Opening this switch reduces the voltage in the pick-up winding to zero by removing the voltage on the excitation windings, and this in turn causes both Thyratrons 75 and 76 to go "out" as hereinbefore described.

It will be noted that the motors are run on half wave rectified current. If the rated motor armature voltage is 220 volts D. C. it is necessary to operate the motor from a 440 volt A. C. line if it is to develop its rated speed at full load. If a full wave rectifier is used, and it does have advantages over a half wave rectifier, a center tapped transformer of 440 volts would be used.

Also, the motors must be oversize because of the increased heating caused by the pulsating D. C. used on the armatures and the fact that the motors operate at all speeds from zero up to full speed and must deliver substantially the same torque at all speeds, without the benefit of proper cooling at low speeds since at such low speeds the fan on the armature is ineffective.

From the foregoing description taken in connection with the accompanying drawings it is apparent to those skilled in the art that this invention provides a control especially adapted for use with duplicating milling machines and the like, by which extreme accuracy and smooth uninterrupted duplication of a pattern or template can be achieved.

What we claim as our invention is:

1. In a control for controlling the supply of E. M. F. to an electric translating machine in accordance with the dictation of a pattern following tracer: a tracer having a stylus adapted for positive and negative displacement from a neutral position in response to contour changes of the pattern; means for translating displacement of the tracer stylus into E. M. F. of different voltages depending upon the direction and amount of tracer stylus displacement; a thermionic rectifier tube of the Thyratron type connected between the translating machine and an A. C. source to supply D. C. to the machine at current values depending upon the conductivity of the tube, the characteristic of the tube being such that its conductivity depends upon the phase angle between its plate and grid voltages; means for impressing an A. C. voltage on the grid of the tube; a phase shifting network for controlling the phase of the A. C. voltage impressed on the grid with relation to the A. C. voltage on the plate of the tube, said phase shifting network including a thermionic tube as its controlling element; and means for applying the varying voltage resulting from tracer stylus displacement on the grid of said thermionic tube in the phase shifting network to control its affect in the network and thereby cause the network to regulate the phase relationship of the grid and plate voltages on the Thyratron tube as commanded by the tracer.

2. In a control for controlling the supply of E. M. F. to a translating machine: a pair of rectifier tubes of the Thyratron type connected between said translating machine and an A. C. source to supply D. C. to the machine, said tubes being connected inversely to each other with the plate of one tied to the cathode of the other so that the tubes supply voltage of opposite polarity to the machine to cause the machine to run forward or in reverse depending upon which of said tubes is conductive, the characteristics of the tubes being such that their conductivity depends upon the phase angle between the voltages applied to their plates and grids; means for producing an E. M. F. of voltage varying in accordance with a controlling factor which is to command the operation of the translating machine; means for supplying A. C. voltage to the grids of the two Thyratrons; and a phase shifting network responsive to and under the control of the E. M. F. of varying voltage for controlling the phase angle relationship between the grid and plate voltages on the Thyratron tubes, said phase shifting network including two thermionic tubes the plate resistance of which depends upon their grid biases, and so connected in the circuit as to act as variable resistances; and means for applying the E. M. F. of varying voltage on the grids of said thermionic tubes so that said thermionic tubes and the phase shifting network is commanded by said controlling factor 3. In an electric control for controlling the supply of E. M. F. to an electric translating machine in accordance with the dictation of a pattern following tracer: a tracer having a stylus adapted to scan the pattern to be followed and to have positive and negative displacement from a balanced position as a result of contour changes in the pattern being scanned; means for translating the tracer stylus displacement into E. M. F. of a voltage varying above and below a predetermined value proportionately to the extent and direction of tracer stylus displacement; a pair of thermionic rectifier tubes of the Thyratron type connected between the translating machine and an A. C. source to supply D. C. to the translating machine at a current value depending upon the conductivity of the tubes, the conductivity of said tubes being controlled by the phase angle between the voltages impressed on their plates and grids, and said tubes being connected inversely with the plate of one tied to the cathode of the other so that conductivity of one drives the translating machine in one direction while the conductivity of the other drives the translating machine the opposite direction; means for impressing an A. C. voltage on the grids of the Thyratron type tubes; a phase shifting network connected with said last named means and operable to bring the grid voltage on one Thyratron tube into phase with its plate voltage while maintaining the grid voltage on the other Thyratron type tube out of phase with its plate voltage and vice versa, said phase shifting network including thermionic tubes one for each Thyratron tube acting as variable resistances in the network to control the same; and means for applying the E. M. F. of varying voltage on the grids of said thermionic tubes to control their affect in the network and thereby cause the network to regulate the phase relationship of the grid and plate voltages of the Thyratrons in accordance with displacement of the tracer stylus above and below its predetermined neutral.

4. In a control for controlling the supply of E. M. F. to an electric translating machine in accordance with the dictation of a pattern following tracer: a tracer having a stylus adapted to scan a pattern and positively and negatively displaceable from a balanced position in response to contour changes of the pattern; means for translating displacement of the tracer stylus into a controlling E. M. F. of different voltages above and below a predetermined value depending upon the direction and amount of the tracer stylus displacement; a thermionic rectifier tube of the Thyratron type connected between the translating machine and an A. C. source to supply D. C. to the machine at current values depending upon the conductivity of the tube, the characteristics of the tube being such that its conductivity depends upon the phase angle between its plate and grid voltages; means for impressing an A. C. voltage on the grid of the tube; a phase shifting network for controlling the phase of the A. C. voltage impressed on the grid of the Thyratron type tube with relation to the voltage on its plate, said network including the A. C. source of grid voltage and a thermionic tube the plate resistance of which is controlled by its grid bias, said network controlling the phase of the A. C. grid voltage source in accordance with the plate resistance of its thermionic tube; means for impressing a predetermined grid bias on the grid of said thermionic tube in the phase shifting network to give the tube a predetermined resistance value; and means for applying the E. M. F. resulting from tracer stylus displacement on the grid of said thermionic tube in the phase shifting network so as to add to or subtract from the voltage of the grid bias on the tube and alter the resistance of the tube accordingly.

5. In a control for controlling the supply of E. M. F. to an electric translating machine in accordance with the dictation of a pattern following tracer: a tracer having a stylus adapted to scan a pattern and positively and negatively displaceable from a balanced position in response to contour changes of the pattern; means for translating displacement of the tracer stylus into a controlling E. M. F. of different voltages above and below a predetermined value depending upon the direction and amount of the tracer stylus displacement; a pair of thermionic rectifier tubes of the Thyratron type connected inversely between the translating machine and an A. C. source to supply D. C. of different polarity to the machine at current values depending upon the conductivity of the tubes, the characteristics of the tubes being such that their conductivity depends upon the phase angle between their plate and grid voltages; means for impressing an A. C. voltage on the grid of each of said tubes; a phase shifting network for controlling the phase of the A. C. voltage impressed on the grids of the tubes with relation to their plate voltage, said network including the A. C. grid voltage sources and a pair of thermionic tubes serving as resistances in the network said network also including means whereby zero resistance at both of said thermionic tubes in the phase shifting network makes the phase angle of the grid and plate voltages of one of the Thyratron type tubes zero while infinite resistance at both of said thermionic tubes in the phase shifting network makes the phase angle between the grid and plate voltages of the other Thyratron type tube zero; means for applying grid biases to said thermionic tubes in the phase shifting network of such value that the resistance of one of said last named tubes is zero and the resistance of the other is infinite and the phase angle of both of the Thyratron type tubes is 180°; and means for applying the voltage resulting from the tracer stylus displacement simultaneously to the grids of said thermionic tubes in the phase shifting network to add to or subtract from their grid biases and thereby render one or the other Thyratron type tube operative.

6. In a control of the character described: a tracer having a stylus displaceable positively and negatively from a balanced position; means for translating displacement of the tracer stylus in either direction from said balanced position into E. M. F. of a magnitude depending upon the amount of the displacement; other means driven by the tracer stylus for generating an E. M. F., the magnitude of which is dependent upon the rate of tracer stylus displacement; a pair of Thyratron type thermionic rectifier tubes for supplying D. C. of opposite polarity to a translating machine, the characteristics of said tubes being such that their conductivity depends upon the phase angle between their plate and grid voltages; means under control of the first named E. M. F. for shifting the phase angle of said Thyratron type tubes to make one or the other of said tubes conductive upon displacement of the tracer stylus from its balanced position; and means for applying the second designated E. M. F. to said phase shifting means to accelerate response of the Thyratron type tubes.

7. In a duplicating machine the combination of: a cutter and tracer couple; a work table supporting the work to be cut and the pattern to be followed, said table and cutter-tracer couple being relatively movable; direct current electric motors for effecting such relative motion between the work table and the cutter-tracer couple; grid controlled thermionic rectifier tubes governing the operation and speed of the motors, said tubes having such characteristics that their conductivity depends upon the phase angle between their grid and plate voltages; phase shifting networks for controlling the phase of the grid biases, said networks including thermionic tubes acting as variable resistances; means for translating tracer displacement into a controlling voltage, the magnitude of which is proportional to tracer displacement; and means for applying the controlling voltage to the grids of the thermionic tubes in the phase shifting networks whereby the control maintained by the phase shifting networks on the grid biases of the thermionic rectifier tubes is governed by tracer displacement.

8. An electric control for controlling the supply of E. M. F. to an electric translating machine in accordance with the displacement of a pattern following tracer comprising: a grid controlled thermionic rectifier tube connected between the translating machine and an A. C. source to supply D. C. to the translating machine of a current value depending upon the conductivity of the tube, said tube having the characteristic that its conductivity depends upon the phase angle between the voltages applied to its plate and grid; means for applying A. C. voltage to the grid of the tube; a variable coupling transformer connected with a current source for supplying a controlling voltage; a pattern following tracer; a movable armature for the variable coupling transformer driven by the tracer for regulating the controlling voltage so that its magnitude is proportional to the extent of the tracer displacement; and means responsive to the controlling voltage and operable on the means for supplying A. C. voltage to the grid of the tube for shifting the phase angle of the grid voltage with relation to the plate voltage proportionately to the amount and direction of tracer displacement.

JAMES W. WILKIE.
EDMOND G. FRANKLIN.